(12) United States Patent
Li

(10) Patent No.: US 7,218,857 B1
(45) Date of Patent: May 15, 2007

(54) METHOD, APPARATUS AND SYSTEM FOR A RE-CONFIGURABLE OPTICAL ADD-DROP MULTIPLEXER

(75) Inventor: Ming Li, Los Altos, CA (US)

(73) Assignee: Avanex Corporation, Fremont, CA (US)

( * ) Notice: Subject to any disclaimer, the term of this patent is extended or adjusted under 35 U.S.C. 154(b) by 712 days.

(21) Appl. No.: 10/402,731

(22) Filed: Mar. 28, 2003

(51) Int. Cl.
*H04J 14/02* (2006.01)
(52) U.S. Cl. ........................................ 398/83
(58) Field of Classification Search .................... 398/83
See application file for complete search history.

(56) References Cited

U.S. PATENT DOCUMENTS

| | | | |
|---|---|---|---|
| 5,778,118 A * | 7/1998 | Sridhar ........................ | 385/24 |
| 6,285,479 B1 * | 9/2001 | Okazaki et al. ............... | 398/56 |
| 6,441,960 B1 * | 8/2002 | Wang et al. ................. | 359/497 |
| 6,529,307 B1 | 3/2003 | Peng et al. | |
| 6,563,978 B2 * | 5/2003 | Matsuoka et al. ............. | 385/24 |
| 6,842,562 B2 * | 1/2005 | Kinoshita et al. ............. | 385/24 |
| 2002/0015553 A1 * | 2/2002 | Claringburn et al. ......... | 385/24 |
| 2003/0002104 A1 * | 1/2003 | Caroli et al. ................. | 359/127 |
| 2003/0025956 A1 * | 2/2003 | Li et al. ...................... | 359/110 |

\* cited by examiner

*Primary Examiner*—Leslie Pascal
(74) *Attorney, Agent, or Firm*—Patterson & Sheridan, L.L.P.

(57) ABSTRACT

A re-configurable optical add/drop apparatus separates an optical input signal into a first signal having a plurality of channels and a second signal having a plurality of channels and includes a channel router with drop ports, a wavelength-selective channel attenuator with a controllable polarization modulator, and an optical coupler. The channel router routes the selected channels of the first signal to the drop ports. The wavelength-selective channel attenuator selectively blocks some of the channels of the second signal to produce a third signal. The optical coupler couples the third signal with a fourth signal having a plurality of add channels to produce an optical output signal.

13 Claims, 13 Drawing Sheets

METHOD, APPARATUS AND SYSTEM FOR A RE-CONFIGURABLE OPTICAL ADD-DROP MULTIPLEXER

CROSS REFERENCE TO RELATED APPLICATIONS

This application relates to a co-pending application, U.S. patent application Ser. No. 09/794,590, entitled "An Optical Wavelength Router using Reflective Surfaces to Direct Output Signals" by Ming Li and Sean Peng, filed on Feb. 26, 2001, owned by the assignee of this application and incorporated herein by reference.

This application also relates to a co-pending application, U.S. provisional patent application Ser. No. 60/432,114, entitled "Method, Apparatus and System for a Variable Optical Attenuator Utilizing a Liquid Crystal Phase Grating" by Haijun Yuan and Song Peng, filed on Dec. 10, 2002, owned by the assignee of this application and incorporated herein by reference.

This application further relates to a co-pending application, U.S. patent application Ser. No. 10/294,398, entitled "Optical Add/Drop Multiplexer Utilizing Variable Optical Attenuator" by Simon X. F. Cao, filed on Nov. 13, 2002, owned by the assignee of this application and incorporated herein by reference.

FIELD OF THE INVENTION

The present invention relates to optical add-drop multiplexers utilized in optical communications systems. More particularly, the present invention relates to re-configurable optical add-drop multiplexers, wherein a plurality of wavelength channels are dropped from a wavelength division multiplexed composite optical signal, wherein a plurality of replacement wavelength channels are added to the composite optical signal and wherein the dropped channels are directed to a plurality of dropped-channel lines such that any dropped channel may be directed, as desired, to one of the plurality of dropped-channel lines and such that ongoing transmission of non-dropped channels is not interrupted.

BACKGROUND OF THE INVENTION

Optical fibers are used extensively in telecommunications systems. It is often necessary to add or drop a wavelength channel in optical links or systems. This can be achieved by a wavelength router or a Reconfigurable Optical Add-drop Multiplexer (R-OADM) that sends different wavelength channels to different locations. FIG. 6 presents a known R-OADM architecture. A composite optical signal entering R-OADM 600 from an input fiber optic line is de-multiplexed into its component channels $\lambda_1, \lambda_2, \ldots, \lambda_n$ by multiplexer 602a. Simultaneously, a set of channels ($\lambda'_1, \lambda'_2$, etc.) to be added are input to R-OADM 600 from add lines 604. The channels $\lambda_1$ and $\lambda'_1$ (if present) are directed to the 2×2 switch 606.1; the channels $\lambda_2$ and $\lambda'_2$ (if present) are directed to the 2×2 switch 606.2; and so on. In the example shown in FIG. 6, it is assumed that the added channels comprise only the two channels $\lambda'_1$ and $\lambda'_2$. Since each add operation is always paired with a concurrent drop operation, this implies that the channels $\lambda_1$ and $\lambda_2$ are dropped—that is, comprise the "dropped" channels. Each of the 2×2 switches 606.1–606.n can be in either one of two states-a "cross state" or a "bar" state. In the example shown in FIG. 6, since the channels $\lambda'_1$ and $\lambda'_2$ are added, the two switches 606.1–606.2, which receive these channels, are in their "cross" states. Since no other channels are added, the switches 606.n (and all other switches) are in their "bar" states. Thus, the channels $\lambda_1$ and $\lambda'_1$ and $\lambda_2$ and $\lambda'_2$ are switched such that the channels $\lambda_1$ and $\lambda_2$ are "dropped" to the drop lines 608 whilst the channels $\lambda'_1$ and $\lambda'_2$ are directed to the multiplexer 602b. The non-dropped or "express" channels $\lambda_3$–$\lambda_n$ are all directed to the multiplexer 602b. The multiplexer 602b multiplexes the "added" channels $\lambda'_1$ and $\lambda'_2$ together with the "express" channels $\lambda_3$–$\lambda_n$ so as to be output as a single composite optical signal along the output fiber optic line.

The conventional R-OADM 600 is re-configurable in the sense that the wavelengths that may be added and dropped may be chosen at the discretion of the user. Although the conventional R-OADM 600 performs its intended function adequately, it requires one 2×2 switch for each wavelength as well as two separate multiplexers. Further, the conventional R-OADM does not provide the capability of re-routing or permuting the dropped wavelengths amongst the various drop lines and does not provide the capabilities of channel power balancing or overall power control. Additional separate components must be coupled to or used in conjunction with the conventional R-OADM 600 to provide these latter capabilities. Accordingly, there is a need in the art for an improved re-configurable OADM that can perform multiple switching operations amongst the various drop ports or drop lines in a single integrated unit and that can also balance the powers of the various channels. The present invention addresses such a need.

SUMMARY OF THE INVENTION

A Re-configurable Optical Add-drop Multiplexer (R-OADM) system is provided that addresses the above-noted needs in the art. A first exemplary embodiment of an R-OADM system in accordance with the present invention comprises an optical input, a band separator optically coupled to the optical input, a 1×n channel router optically coupled to the band separator via a first optical coupling and optically coupled to a plurality of n channel drop ports, a plurality of p channel add ports, a p×1 coupler optically coupled to the plurality of channel add ports, a second optical coupling optically coupled to the band separator, a third optical coupling optically coupled to the p×1 coupler, an optical output and a 2×1 optical coupler optically coupled to the second and third optical couplings and to the optical output. The 1×n channel router is capable of directing, in re-configurable fashion, each channel from among a plurality of channels received from the band separator to any one of the plurality of n channel drop ports independently of the directing of any of the other channels. The non-dropped express channels are delivered from the band separator to the 2×1 optical coupler via the second optical coupling. The plurality of channel add ports delivers replacement or added channels to the p×1 coupler, from which they are directed to the optical output via the third optical coupling and the 2×1 optical coupler. The optical output therefore carries both the added and express channels. The band separator may be replaced by an interleaved channel separator.

A second exemplary embodiment of an R-OADM system in accordance with the present invention comprises an optical input, an optical splitter optically coupled to the optical input, a 1×n channel router optically coupled to the optical splitter via a first optical coupling and optically coupled to a plurality channel drop ports, a wavelength-selective channel attenuator optically coupled to the optical splitter via a second optical coupling, a plurality of p channel add ports, a p×1 coupler optically coupled to the plurality of channel add ports, a third optical coupling optically coupled to the p×1 coupler, a fourth optical coupling optically coupled to the wavelength-selective channel attenuator, a 2×1 optical coupler optically coupled to the fourth and third optical couplings and an optical output optically coupled to the 2×1 optical coupler. The 1×n channel router is capable of directing, in re-configurable fashion, each channel from among a plurality of channels received from the optical splitter to any one of the plurality of n channel drop ports independently of the directing of any of the other channels. The non-dropped express channels are delivered from the optical splitter to the wavelength-selective channel attenuator via the second optical coupling. The wavelength-selective channel attenuator provides the capability of independently attenuating the power each of the wavelength channels delivered to it from the second optical coupling, thereby balancing the various optical powers of express channels and completely blocking the dropped channels. The express channels are delivered from the wavelength-selective channel attenuator to the optical output via the fourth optical coupling and the 2×1 optical coupler. The plurality of channel add ports delivers replacement or added channels to the p×1 coupler, from which they are directed to the optical input via the third optical coupling and the 2×1 optical coupler. The optical output therefore carries both the added and express channels.

DETAILED DESCRIPTION

The present invention provides a system and method for a re-configurable optical add-drop multiplexer (R-OADM). The following description is presented to enable one of ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the apparatus and method for a fiber optic housing and aligning device of the present invention, the reader is referred to the appended FIGS. 1–5 in conjunction with the following description.

Figure 1A:
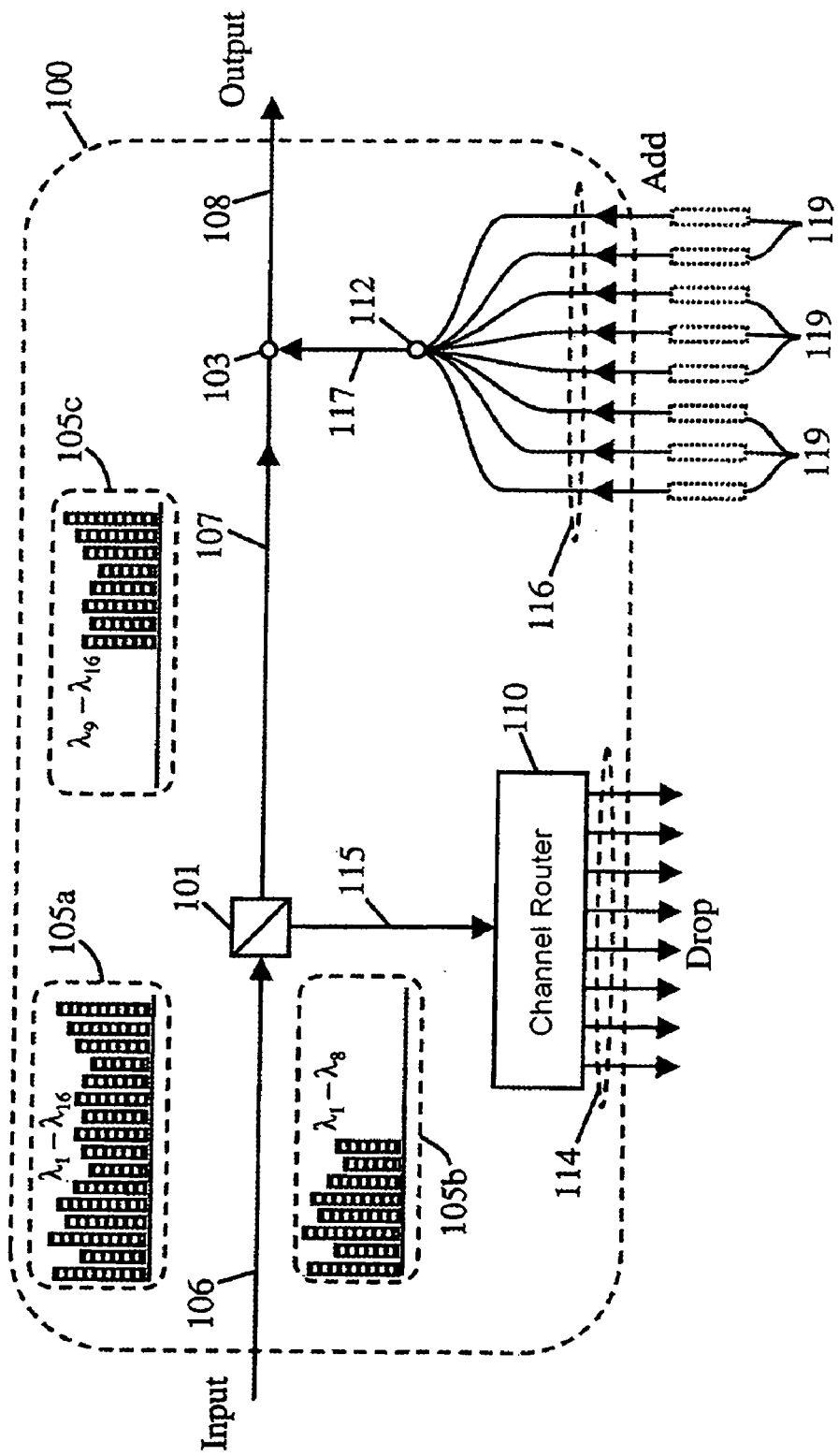
FIG. 1A is a diagram of a first preferred embodiment of a re-configurable optical add-drop multiplexer in accordance with the present invention.

FIG. 1A illustrates a first preferred embodiment of a re-configurable optical add-drop multiplexer system in accordance with the present invention. The R-OADM system 100, shown in FIG. 1A, comprises an optical input 106, a band separator 101 optically coupled to the input 106, a 1×n channel router 110, wherein the 1×n channel router 110 is optically coupled to the band separator 101 via a first optical coupling 115 and a plurality 114 of n channel drop ports (n≧2) optically coupled to the 1×n channel router 110. The R-OADM system 100 further comprises a plurality 116 of p channel add ports (p≧2), a p×1 coupler 112 optically coupled to each one of and all of the plurality 116 of channel add ports, a second optical coupling 107 optically coupled to the band separator 101, a third optical coupling 117 optically coupled to the p×1 coupler 112, an optical output 108 and a 2×1 optical coupler 103 optically coupled to all of the second 107 and third 117 optical couplings and to the optical output 108.

Each optical coupling comprising the R-OADM system 100 (as well as other embodiments described herein) preferably comprises at least one optical fiber as well as any optical components, such as focussing lenses or collimators (not specifically shown), required to inject light into and extract light from the at least one optical fiber. However, the first 115, second 107 and third 117 optical couplings need not be limited to optical fibers. For instance, portions of one or all of these couplings may comprise planar wave guides. Alternatively, portions of one or all of these couplings may be provided within free space using focussing and collimating lenses, mirrors or prisms as necessary. One of ordinary skill in the art will readily understand these and other alternative methods of constructing the optical couplings.

The p×1 coupler 112 and the 2×1 optical coupler 103 comprising the R-OADM system 100 (as well as other embodiments described herein) may comprise star couplers or simple fused couplers or directional couplers, all of which are well-known in the art. The band separator 101 may comprise one or more optical filters, such as a thin-film filters, together with any necessary optical components required to deliver optical signals to and from the optical filter(s). Alternatively, the band separator may be purchased commercially.

The optical input 106 delivers a plurality q (q>n) of wavelength channels to the R-OADM system 100 from an optical communications system. The plurality of such input channels are schematically illustrated in box 105*a* of FIG. 1A. The band separator 101 separates these q channels, according to wavelength, into a first group of m channels, comprising the dropped channels, directed into the first optical coupling 115 and a second group of (q−m) channels, comprising the express channels, directed into the second optical coupling 107. Box 105*b* and box 105*c* schematically illustrate the first group of m channels and the second group of (q−m) channels, respectively. As shown in boxes 105*b*–105*c*, respectively, the first group of m dropped channels comprises a first wavelength band and the second group of (q−m) express channels comprises a second wavelength band that is distinct from the first wavelength band. The wavelengths of the first wavelength band may be either greater or lesser than those of the second wavelength band.

The 1×n channel router 110 of the R-OADM system 100 receives the first group of m channels. The 1×n channel router 110, whose functioning is described in greater detail in the discussion following, is capable of directing any and every channel $\lambda_i$ comprising the first group of m channels to any one of the plurality 114 of n channel drop ports. The "1×n" designation of the 1×n channel router 110 refers to the fact that it receives a single input and is capable of delivering channels to any one of n outputs. The number n of such outputs may be either fewer than, equal to or greater than the number m of channels delivered to the channel router 100 via the first optical coupling 115. The number of channels directed to any one of the plurality 114 of n channel drop ports may range between zero and m. Therefore, each one of the plurality 114 of n channel drop ports may carry no channels, a single channel, or a composite optical signal comprising a plurality of wavelength division multiplexed channels. The 1×n channel router 110 is capable of directing each one of the m received channels to a channel drop port independently of any of the other channels and is also capable of re-directing each and any channel during normal operation of the system 100.

The plurality 116 of channel add ports delivers replacement or added channels to the R-OADM system 100. Each replacement channel delivered by one of the plurality 116 of channel add ports comprises the same wavelength as, but different information content from, one of the channels dropped at one of the plurality 114 of channel drop ports. For instance, if the channels $\lambda_i$ and $\lambda_j$ are dropped, the replacement channels, if present, are designated as $\lambda'_i$ and $\lambda'_j$, respectively. Since every dropped channel resides within the aforementioned first wavelength band, every replacement channel also resides within the first wavelength band. The total number of replacement or added channels is less than or equal to the quantity m. Each one of the plurality 116 of p channel add ports may carry no channels, a single channel, or a composite optical signal comprising a plurality of wavelength division multiplexed channels. Optionally, one or more of the plurality of channel add ports may be optically connected to an optical transmitter 119 that provides a replacement channel locally.

The replacement or added channels are combined by the p×1 optical coupler 112 such that all these replacement or added channels are carried by the third optical coupling 117 to the 2×1 optical coupler 103. These added channels comprise a third group of channels. Furthermore, the second optical coupling 107 provides the second group of (q−m) channels to the 2×1 optical coupler 103. The 2×1 optical coupler 103 combines the second group of channels together with the third group of channels so as to provide an output composite optical signal that leaves the system 100 and is directed to an optical communications system via the output 108. Alternatively, the 2×1 coupler 103 could be replaced by a band combiner, which is the same or similar apparatus as band separator 101, but utilized in the opposite sense.

Figure 1B:
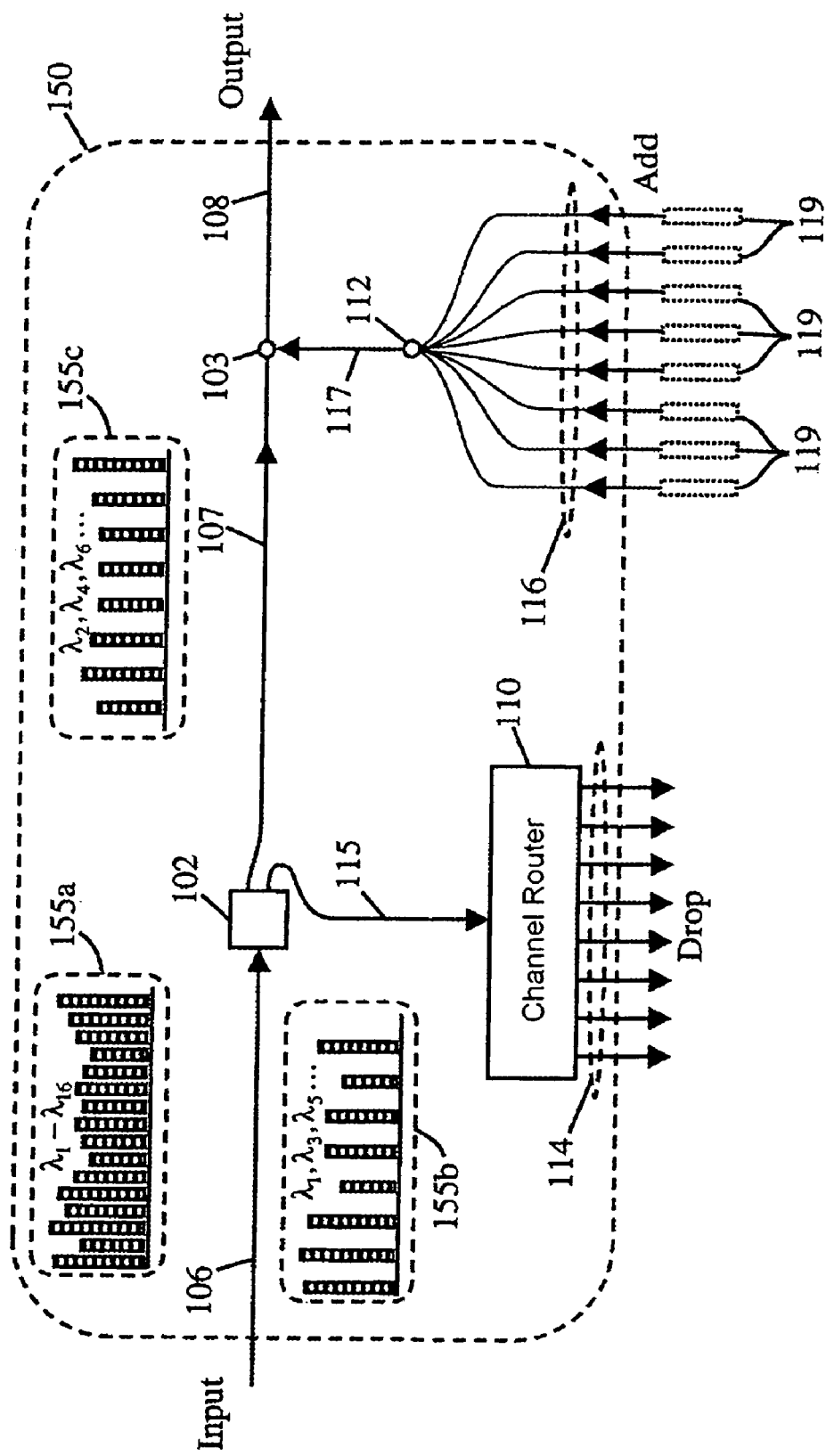
FIG. 1B is a diagram of a second preferred embodiment of a re-configurable optical add-drop multiplexer in accordance with the present invention.

FIG. 1B illustrates a second preferred embodiment of a re-configurable optical add-drop multiplexer system in accordance with the present invention. The R-OADM system 150, shown in FIG. 1B, comprises all the same elements as the system 100 (FIG. 1A) except that the aforementioned band separator is replaced, within the system 150, by an interleaved channel separator 102. The interleaved channel separator 102 divides the input composite optical signal into a first set of channels (i.e., dropped channels) delivered to the first optical coupling 115 and a second set of channels (i.e., express channels) delivered to the second optical coupling 107, wherein the channels comprising the first set are interleaved with the channels comprising the second set. Such interleaved channel separators, which are also known as "interleavers", are well-known in the art. For instance, if the channels received from the input 106 are as shown in box 155*a*, the interleaved channel separator may, for instance, divide these channels into a first set of channels comprising the odd channels ($\lambda_1$, $\lambda_3$, $\lambda_5$, etc), shown in box 155*b*, and a second set of channels comprising the even channels ($\lambda_2$, $\lambda_4$, $\lambda_6$, etc), shown in box 155*c*, wherein the first set of channels is delivered to the 1×n channel router 110 via the first optical coupling 115 and the second set of channels if delivered to the 2×1 optical coupler 103 via the second optical coupling 107. The system 150 may be advantageous over the system 150 in such cases wherein the initial set of input channels are spaced too closely to be properly separated by the 1×n channel router 110.

Figure 2A:
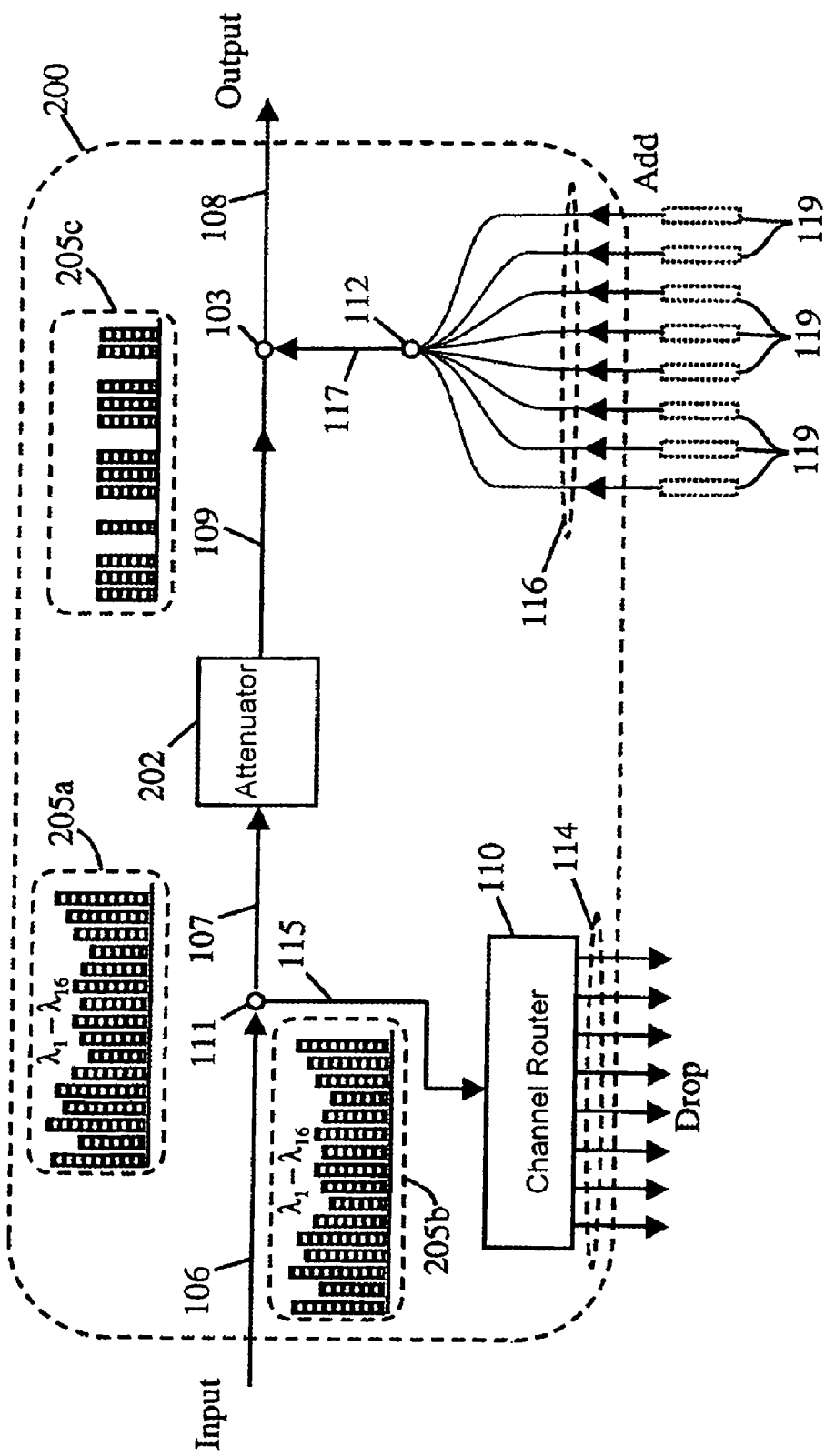
FIG. 2A is a diagram of a third preferred embodiment of a re-configurable optical add-drop multiplexer in accordance with the present invention.

FIG. 2A is a diagram of a third preferred embodiment of a re-configurable optical add-drop multiplexer in accordance with the present invention. The R-OADM system 200, shown in FIG. 2A, comprises an optical input 106, an optical splitter 111 optically coupled to the input 106, a 1×n channel router 110, wherein the 1×n channel router 110 is optically coupled to the optical splitter 111 via a first optical coupling 115 and a plurality 114 of n channel drop ports (n≧2) optically coupled to the 1×n channel router 110. The R-OADM system 200 further comprises a wavelength-selective channel attenuator 202 that is optically coupled to the optical splitter 111 via a second optical coupling 107, a plurality 116 of p channel add ports (p≧2), a p×1 coupler 112 optically coupled to each one of and all of the plurality 116 of channel add ports, a third optical coupling 117 optically coupled to the p×1 coupler 112, a fourth optical coupling 109 optically coupled to the wavelength-selective channel attenuator 202, a 2×1 optical coupler 103 optically coupled to the fourth 109 and third 117 optical couplings and an optical output 108 optically coupled to the 2×1 optical coupler 103. Preferably, the optical splitter 111 comprises a well-known 3-dB optical splitter that divides an optical signal into two equally-powered portions delivered to the first optical coupling 115 and the second optical coupling 107, respectively. However, the optical splitter 111 may, in general, be any optical splitter that divides an optical signal into portions—possibly comprising non-equal powers—without regard to wavelength. Optionally, one or more of the plurality of channel add ports may be optically connected to an optical transmitter 119 that provides a replacement channel locally.

The inset boxes 205*a*–205*c* within FIG. 2A schematically illustrate the relative intensities of optical channels passing through the R-OADM 200. A hypothetical spectrum of sixteen such channels, as received from input 106, is shown in box 205a. Generally, the optical intensity or power will vary from channel to channel as shown in box 205a. The optical splitter 111, assumed here to be a 3-dB optical splitter, separates the optical power comprising the channels such that substantially 50% of the optical power of each channel is delivered to the 1×n channel router 110 via the first optical coupling 115 and the remaining 50% is delivered to the wavelength-selective channel attenuator 202 via the second optical coupling 107. Since the optical splitter 111 is not wavelength selective, the relative intensity or power variations between channels remain the same as those in the input signal prior to passing through the optical splitter 111. For instance, inset box 205b within FIG. 2A illustrates the spectrum of channels delivered to the 1×n channel router 110 via the first optical coupling 115. The spectrum of channels delivered to the wavelength-selective channel attenuator 202 via the second optical coupling 107 is similar to that shown in box 205b. It is to be kept in mind that the vertical scales are different among the different inset boxes 205a–205c and thus the relative intensities of channels can only be compared within any individual one of the boxes 205a–205c and cannot be compared between these inset boxes.

The channels that are delivered to the 1×n channel router 110 via the first optical coupling 115 within the R-OADM 200 (FIG. 2A) comprise both the desired dropped channels as well as the express channels. The channels delivered to the wavelength-selective channel attenuator 202 also comprise all the channels, including the express channels as well as the dropped channels. Each dropped channel must ultimately be routed to one of the plurality 114 of channel drop ports and each express channel must ultimately be routed to the optical output 108. Further, to avoid inter-channel contamination, no designated express channel should be delivered to any one of the plurality 114 of channel drop ports and no designated dropped channel should pass through the wavelength-selective channel attenuator 202. Still further, any channel power imbalances between the channels must be equalized before delivery to the output 108.

The 1×n channel router 110 addresses the channel contamination avoidance requirements noted in the preceding paragraph through its capability of delivering any channel to any one of the plurality 114 of channel drop ports or, alternatively, of routing any channel away from all of the ports. These capabilities are described in greater detail in a following discussion in this document. Further, the wavelength-selective channel attenuator 202 provides the capability of independently attenuating the power each of the wavelength channels delivered to it through the second optical coupling 107. This attenuation capability serves to reduce the optical power of channels express whose powers are relatively too strong so as to balance these various optical powers. The attenuation capability also serves to completely attenuate or block the wavelengths of the dropped channels so that these wavelengths do not propagate through the wavelength-selective channel attenuator 202. These wavelength attenuation capabilities of the wavelength-selective channel attenuator 202 are more fully described in greater detail in a following discussion in this document.

The spectrum of channels exiting the wavelength-selective channel attenuator 202 to the third optical coupling 109 is schematically illustrated in inset box 205c of FIG. 2A. In the particular operational example relating to FIG. 2A, it is assumed that the fourth, sixth, tenth and fourteenth channels ($\lambda_4$, $\lambda_6$, $\lambda_{10}$ and $\lambda_{14}$, respectively) comprise the dropped channels and that the remaining channels comprise express channels. By comparing the spectrum of channels shown in box 205c to that shown in box 205a, it may be readily seen that the wavelength-selective channel attenuator 202 completely blocks the passage of these channels, whose positions are seen as gaps in the spectrum of channels in box 205c. Further, the optical powers of the express channels exiting the wavelength-selective channel attenuator 202 are balanced through selective attenuation of channels whose powers are relatively greater upon entry into the wavelength-selective channel attenuator 202.

As previously described, the replacement or added channels are combined by the p×1 optical coupler such that all these replacement or added channels are carried by the third optical coupling 117 to the 2×1 optical coupler 103. In the present example, these replacement channels comprise the four channels $\lambda'_4$, $\lambda'_6$, $\lambda'_{10}$ and $\lambda'_{14}$. These replacement channels are combined together with the express channels (shown in inset box 205c) at the 2×1 optical coupler 103 such that the combined sets of channels exit the system 200 to the optical output 108.

Figure 2B:
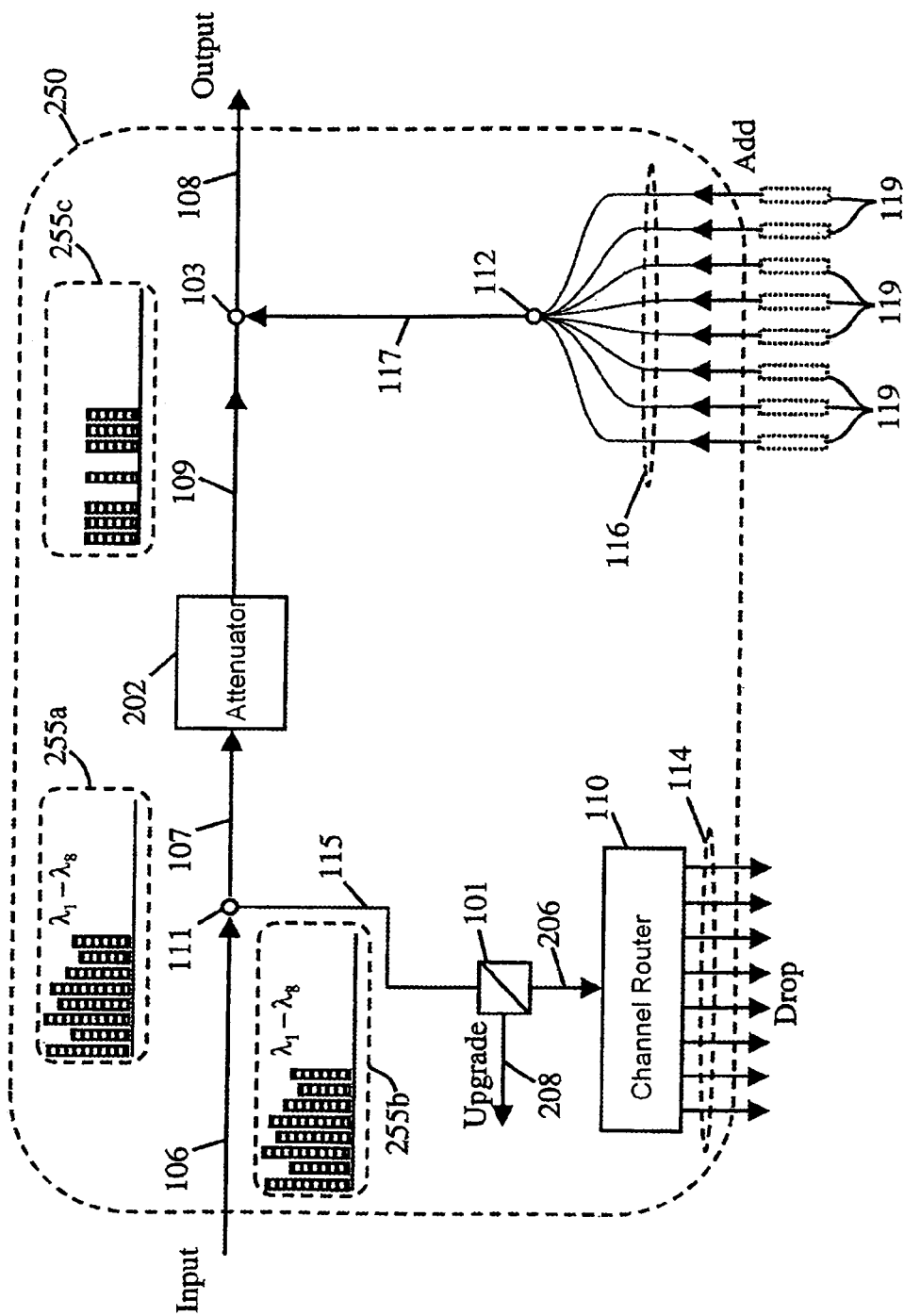
FIG. 2B is a diagram of a fourth preferred embodiment of a re-configurable optical add-drop multiplexer in accordance with the present invention.
Figure 2C:
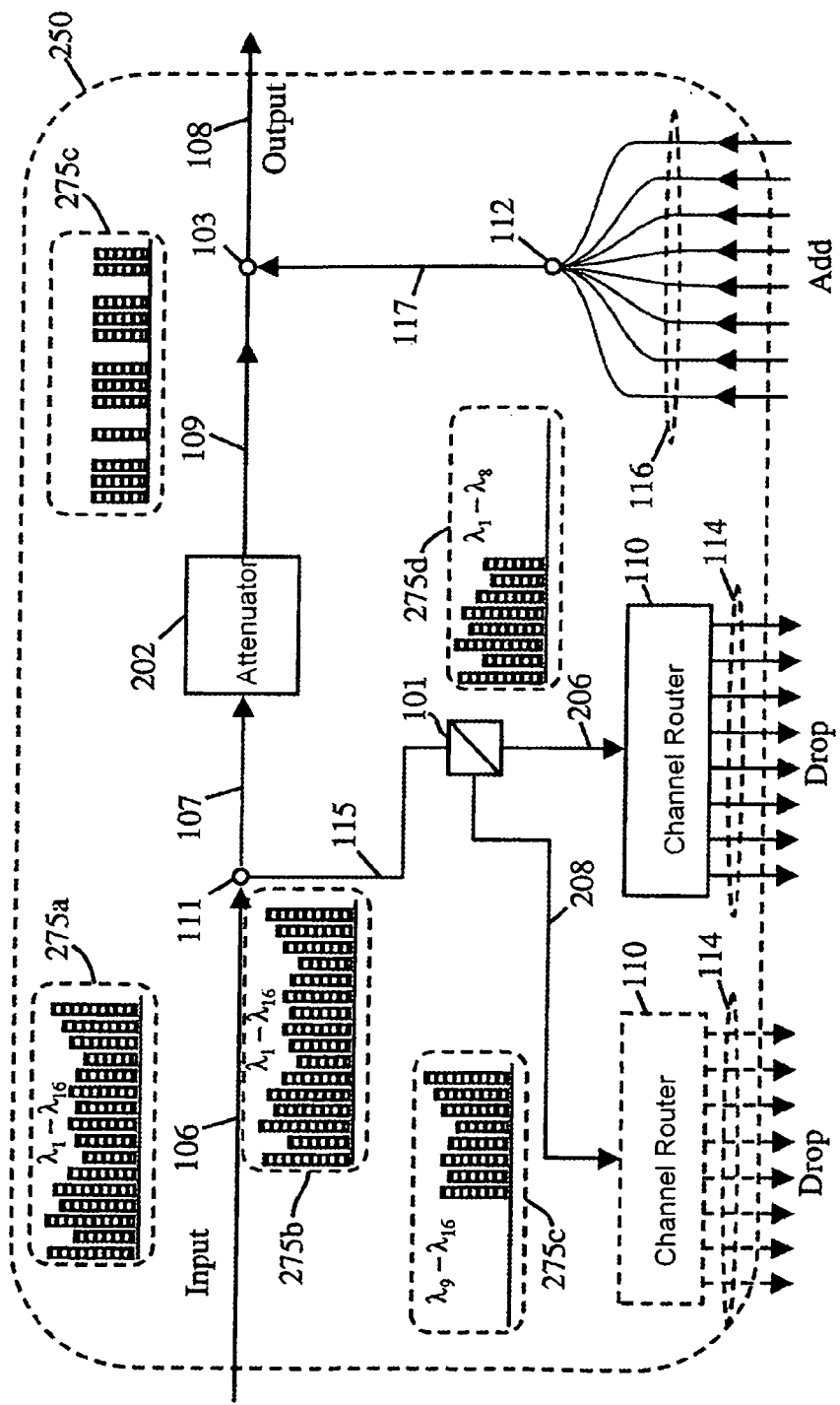
FIG. 2C is a second diagram of the fourth preferred embodiment of a re-configurable optical add-drop multiplexer in accordance with the present invention showing optional upgrade components.

Both FIGS. 2B–2C are diagrams of a fourth preferred embodiment of a re-configurable optical add-drop multiplexer in accordance with the present invention. The R-OADM system 250, as shown in FIG. 2B, comprises the following components in common with the R-OADM system 200 (FIG. 2A) already described: the optical input 106, the optical splitter 111 optically coupled to the optical input 106, the first optical coupling 115 and second optical coupling 107 both optically coupled to the optical splitter, the wavelength-selective channel attenuator 202 optically coupled to the optical splitter 111 via the second optical coupling 107, the plurality 116 of p channel add ports, the p×1 coupler 112 optically coupled to each one of and all of the plurality 116 of channel add ports, the third optical coupling 117 optically coupled to the p×1 coupler 112, the fourth optical coupling 109 optically coupled to the wavelength-selective channel attenuator 202, the 2×1 optical coupler 103 optically coupled to the fourth 109 and third 117 optical couplings and the optical output 108 optically coupled to the 2×1 optical coupler 103. The R-OADM system 250 also comprises the aforementioned 1×n channel router 110, and the aforementioned plurality 114 of n channel drop ports (n≧2) optically coupled to the 1×n channel router 110. Optionally, one or more of the plurality of channel add ports of the R-OADM system 250 may be optically connected to an optical transmitter 119 that provides a replacement channel locally (see FIG. 2B).

In contrast to the configuration within the R-OADM 200 (FIG. 2A), the 1×n channel router 110 within the R-OADM 250 (FIG. 2B) is not directly coupled to the first optical coupling 115. Instead, within the R-OADM 250, the first optical coupling 115 optically couples the optical splitter 111 to a band separator 101. The 1×n channel router 110 is optically coupled to the band separator 101 via a fifth optical coupling 206 as shown in FIGS. 2B–2C. Further, the band separator 101 is optically coupled to an upgrade port 208.

Comparison between FIG. 2B and FIG. 2C illustrates the role of the band separator 101 and upgrade port 208 within the R-OADM 250. The upgrade port 208 permits more channel-handling capability to be added after system installation. As shown in FIG. 2C, the upgrade port 208 may be optically coupled to an optional second 1×n channel router 110 (shown as dashed lines in FIG. 2C) that, if present, is optically coupled to a second plurality 114 of n channel drop ports. The presence of the band separator 101 and the upgrade port 208 permit convenient upgrading of the R-OADM 250 so as to be able to drop a greater number of channels. The band separator 101 is capable of separating wavelengths received from the first optical coupling into a first band of wavelengths and a second band of wavelengths, wherein the first band of wavelengths passes directly to the fifth optical coupling 206 whilst the second band of wavelengths passes to the upgrade port 208.

In the example of the operation of the R-OADM 250 shown in FIG. 2B, it is assumed that eight different wavelengths ($\lambda_1$–$\lambda_8$) comprising a single first band of wavelengths may be processed. In the example of FIG. 2B, it is assumed that the fourth and sixth channels ($\lambda_4$ and $\lambda_6$, respectively) are dropped and that the remaining channels comprise the express channels. The spectrum of eight wavelengths input to the R-OADM 250 are shown in inset box 255a shown in FIG. 2B. These are split by the splitter 111 as previously described, with, for example, half the power of each channel directed to the first optical coupling 115 and half the optical power of each channel directed to the second optical coupling 107. Since the band separator 101 passes the first band of wavelengths ($\lambda_1$–$\lambda_8$) through to the single channel router 110 via the fifth optical coupling 206, the system 250 operates essentially as previously described in reference to the system 200. The spectrum of wavelengths split off to the first optical coupling 115 is shown in inset box 255b of FIG. 2B. The spectrum of express channel wavelengths exiting the wavelength-selective channel attenuator to the fourth optical coupling 109 is shown in inset box 255c of FIG. 2B.

The channel router 110 shown in the example of FIG. 2B is only capable of processing the eight channels $\lambda_1$–$\lambda_8$. If, after installation of system 250 within an optical communications network, it is decided to upgrade the capacity of the optical communications system to sixteen channels ($\lambda_1$–$\lambda_{16}$), the R-OADM system 250 may be reconfigured as shown in FIG. 2C. In the example shown in FIG. 2C, the spectrum of sixteen channels received from the input 106 is shown in the inset box 275a. Further, the spectrum of channels split off from the splitter 111 to the first optical coupling 115 is shown in inset box 275b. The spectrum of channels split off from the splitter 111 to the second optical coupling 107 is not shown but is similar to that shown in inset box 275b. The spectrum of channels exiting the wavelength-selective channel attenuator 202 to the fourth optical coupling 109 is shown in FIG. 275c. Note that, in this example (FIG. 2C), it is assumed that the fourth, sixth, tenth and fourteenth channels ($\lambda_4$, $\lambda_6$, $\lambda_{10}$ and $\lambda_{14}$, respectively) comprise the dropped channels and that the remaining channels comprise express channels.

The sixteen channels (of the present example) delivered to the band separator 101 via the first optical coupling 115 of the R-OADM system 250 are shown in inset box 275b of FIG. 2C. The band separator 101 separates these channels into a first band of channels ($\lambda_1$–$\lambda_8$) shown schematically in inset box 275d and a second band of channels ($\lambda_9$–$\lambda_{16}$) shown schematically in inset box 275c. The first band of eight channels is directed to the first channel router 110 via the fifth optical coupling 206 whilst the second band of eight channels is directed to the second channel router 110 via the upgrade port 208. The first channel router 110 (shown in solid outline) directs the channels $\lambda_4$ and $\lambda_6$ to channel drop ports optically coupled thereto and directs the channels $\lambda_1$–$\lambda_3$, $\lambda_7$ and $\lambda_8$ away from any channel drop ports. The second channel router 110 (shown in dashed outline) directs the channels $\lambda_{10}$ and $\lambda_{14}$ to channel drop ports optically coupled thereto and directs the channels $\lambda_9$, $\lambda_{11}$–$\lambda_{13}$, $\lambda_{15}$ and $\lambda_{16}$ away from any channel drop ports.

Figure 3A:
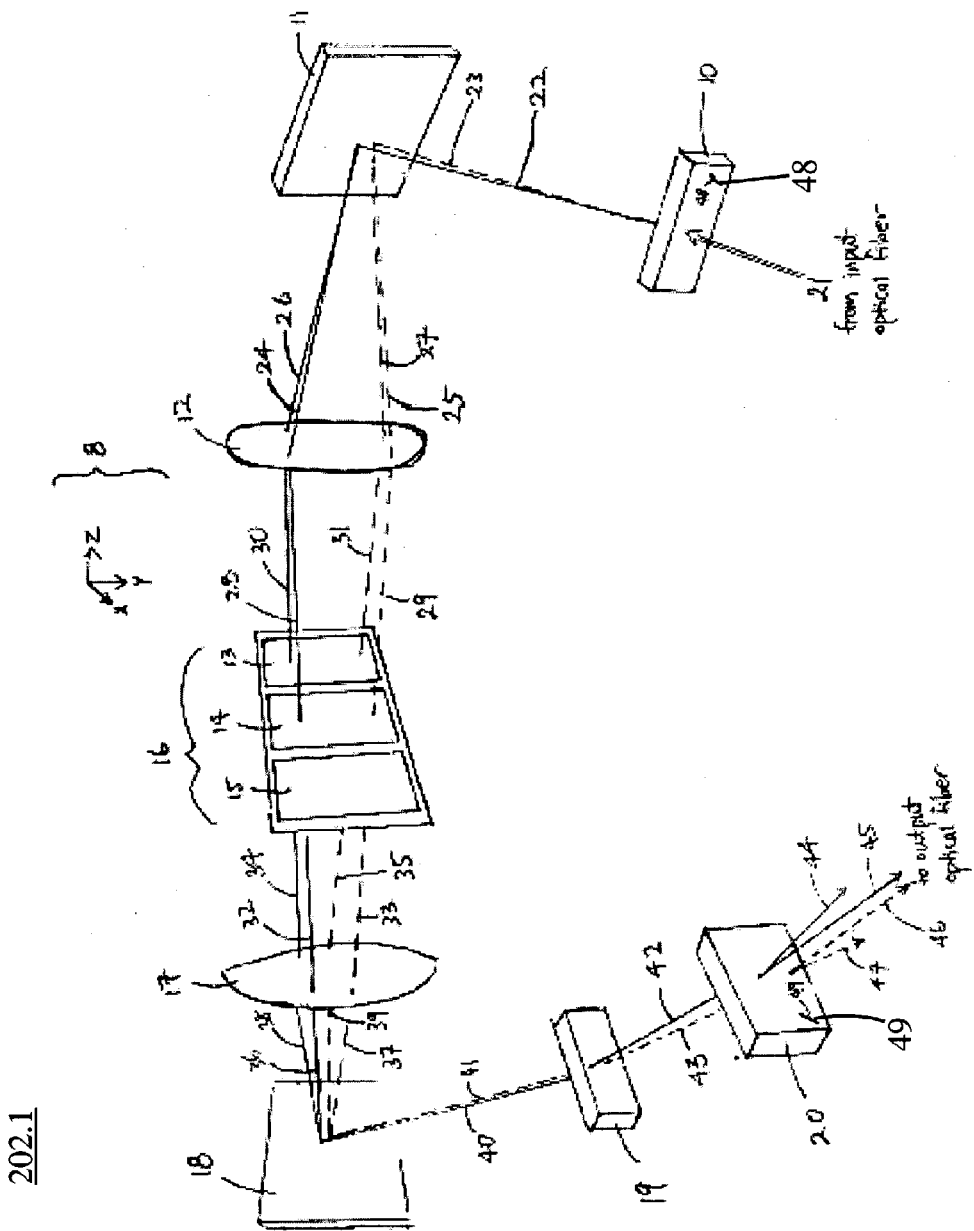
FIG. 3A is an illustration of a first wavelength-selective channel attenuator suitable for use within an R-OADM system in accordance with the present invention.

FIG. 3A depicts a first wavelength-selective channel attenuator 202.1 suitable for use within an R-OADM system in accordance with the present invention. The wavelength-selective channel attenuator 202 shown in FIG. 3A is disclosed in greater detail in a co-pending United States patent application, incorporated herein by reference in its entirety, filed Jun. 4, 2001, having Ser. No. 09/874,474 and titled "Selective Intensity Modulation of Channels in a Multi-plexed Optical Communication System". The wavelength-selective channel attenuator 202.1 includes a first birefringent wedge 10, a first wavelength dispersive element 11, a lens 12, a polarization modulator 16, a second lens 17, a second wavelength dispersive element 18, a half-wave plate 19, and a second birefringent wedge 20, which are optically coupled. The first birefringent wedge 10 has optic axis 48 lying along the z-direction as defined by coordinate system 8. Thus, when a beam 21 of arbitrarily polarized light travels along the x-axis as defined by coordinate system 8 and strikes the birefringent wedge 10, the beam is split into a first beam 22 polarized in the y-direction and a second beam 23 polarized in the z-direction. Birefringent wedge 10 may be made of any conventional birefringent material, such as calcite, rutile, yttrium vanadate, and yttrium orthovanadate. First wavelength dispersive element 11 and second wavelength dispersive element 18 may be diffraction gratings or prisms. Polarization modulator 16 may be, but is not limited to, a liquid crystal device, and may be substituted by any device that can significantly alter the polarization states of incident channels. Polarization modulator 16 includes a plurality of segments, shown in FIG. 3A as segments 13, 14, and 15 along the x-axis as defined by coordinate system 8. Each segment can be made to change the polarization state of an incident beam. Half-wave plate 19 rotates the polarization direction of an incident beam by ninety degrees. Second birefringent wedge 20 has optic axis 49 lying substantially in the z-direction.

Input signal 21 is typically a collimated broad-band beam of an arbitrary polarization state. The polarization state of input signal 21 may be time-varying. When input signal 21 from an input optical fiber (not shown) strikes birefringent wedge 10, input signal 21 splits into two orthogonally linearly polarized beams, first beam 22 and second beam 23, along the y-axis as defined by coordinate system 8. For clarity of illustration, FIG. 3A shows first beam 22 with a solid line and second beam 23 with a dashed line. If first birefringent wedge 10 has a greater index of refraction along the extraordinary axis (e.g., as in yttrium orthovanadate) than along the ordinary axis, first beam 22 will have a polarization direction perpendicular to optic axis 48 and second beam 23 will have a polarization direction parallel to optic axis 48.

First and second beams 22 and 23 strike wavelength dispersive element 11, which spatially separates first beam 22 by wavelength into channels 24 and 26 and spatially separates second beam 23 into channels 25 and 27, along the x-axis as defined by coordinate system 8. Although only two wavelength channels are shown for clarity, input beam 21 may contain more than two wavelength channels. Lens 12 focuses the incident channels 24, 25, 26 and 27 onto different segments of polarization modulator 16. Lens 12 focuses beams 26 and 27 onto segment 13 of polarization modulator 16 as converging channels 30 and 31, respectively. Also lens 12 focuses beams 24 and 25 onto segment 14 of polarization modulator 16 as converging channels 28 and 29, respectively. Each of segments 13, 14 and 15 can be set to change the polarization state of incident beams in a desired manner. After passing through segments 13 and 14, channels 28 and 30, which are assumed to be polarized in a direction perpendicular to optic axis 48 as mentioned above, may become elliptically polarized channels 32 and 34, respectively. Similarly, channels 29 and 31, which are assumed to be polarized in a direction parallel to optic axis 48, may become elliptically polarized channels 33 and 35 after passing through segments 13 and 14. Channels 32, 33, 34 and 35 strike second lens 17, which collimates channels 32, 33, 34, and 35 to form collimated channels 36, 37, 38 and 39. Collimation may be achieved by positioning lens 17 a focal length away from polarization modulator 16 in the particular medium between lens 17 and polarization modulator 16. The term "focal length", as used herein, refers to the focal length of lens 17. Collimated channels 36, 37, 38 and 29 strike second wavelength dispersive element 18, which recombines the channels into output beams 40 and 41. In the embodiment shown in FIG. 3A, channels 36 and 38 are combined into first output beam 40, and channels 37 and 39 are combined into second output beam 41. First and second output beams 40 and 41 are generally elliptically polarized.

Output beams 40 and 41 each contain two orthogonal polarization components. Of the two polarization components in output beams 40 and 41, the polarization components that result from passing through polarization modulator 16 are rotated ninety degrees by half-waveplate 19 so as to form output beams 42 and 43. Output beams 42 and 43 enter second birefringent wedge 20, which has optic axis 49 lying substantially in the z-direction as shown in FIG. 3A and defined by coordinate system 8. Birefringent wedge 20 splits output beam 42 into output signals 44 and 45 according to polarization states. Similarly, birefringent wedge splits output channel 43 into output signals 46 and 47 according to polarization states. Output signals 45 and 46 propagate in a parallel direction with respect to each other, and are therefore both coupled into an output fiber (not shown). Output signals 44 and 47, which constitute light having the original polarization states of first and second input beams 22 and 23, propagate at an angle with respect to output signals 45 and 46. Output signals 44 and 47 are therefore not coupled into an optical fiber, resulting in the attenuation of the output signal. By controlling the segments of polarization modulator 16, the intensity of output signals 45, 46, 47 and 48 can be modulated.

Figure 3B:
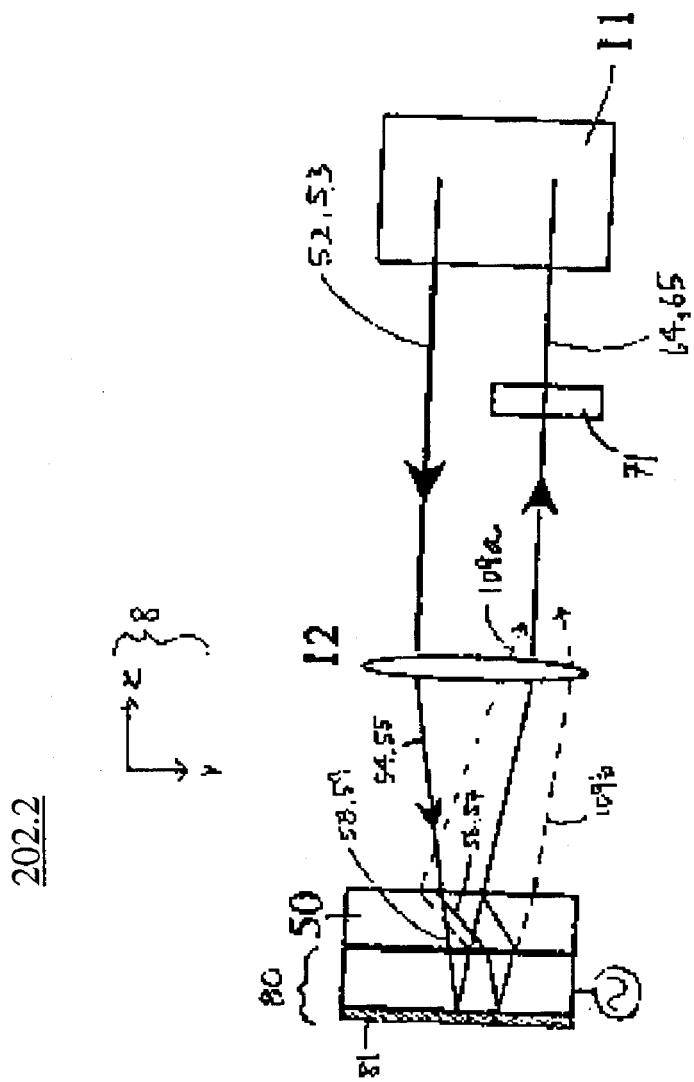
FIG. 3B is an illustration of a second wavelength-selective channel attenuator suitable for use within an R-OADM system in accordance with the present invention.

FIG. 3B shows another wavelength-selective channel attenuator 202.2 suitable for use within an R-OADM system in accordance with the present invention. The wavelength-selective channel attenuator 202.2 shown in FIG. 3B is disclosed in greater detail in the aforementioned co-pending United States patent application having Ser. No. 09/874,474, which is incorporated herein by reference in its entirety. The wavelength-selective channel attenuator 202.2 uses reflective polarization modulator 80, instead of the previously described polarization modulator 16, wavelength dispersive element 11, and a birefringent wave plate (not shown). Reflective polarization modulator 80, which has a reflective surface 81, is a waveplate with retardation tunable in the range between zero and quarter wavelength. The optic axis of the wave plate lies at a 45-degree angle to both the x-axis and the y-axis as defined as defined by coordinate system 8. When input channels 52 and 53 strike first birefringent beam displacer 50, the portion that is polarized in the x-direction as defined by coordinate system 8 (i.e., beams 58 and 59) passes through without displacement, while the portion that is polarized in the y-direction (beams 56 an 57) is displaced. When retardation for a channel is tuned to zero, reflective polarization modulator 80 does not change the polarization of incident channels. Thus, when retardation is set at zero, channels 52 and 53 (which become focussed channels 54 and 55 after passing through lens 12) travel through birefringent beam displacer 50 and reflective polarization modulator 80 in the path shown with solid lines, and the channels are not attenuated. On the other hand, when retardation is set at a non-zero value, reflective polarization modulator 80 changes the polarization of incident beams. When the polarization is changes, the reflected channels each split into two beams upon passing through birefringent beam displacer 50 on their way to wavelength dispersive element 11. The portion of beam 58 that became polarized in the y-direction as defined by coordinate system 8 is displaced along the y-direction, as shown by dashed line 109$a$. The portion of beam 56 that became polarized in the x-direction as defined by coordinate system 8, on the other hand, is not displaced when passing through first birefringent beam displacer 50, as shown by dashed line 109$b$. Beams depicted by dashed lines 109$a$ and 109$b$ propagate in different directions from beams 64 and 65, and are not coupled into the output fiber. Elimination of the two beams leads to channel attenuation, and the degree of attenuation is controlled by tuning reflective modulator 80.

The optional half-wave waveplate 71 with an optic axis aligned 45 degrees to both the x-axis and the y-axis as defined by coordinate system 8 can be used to eliminate polarization dependent loss (PDL). Half-wave waveplate 71 rotates the polarization of an incident channel to balance the diffraction efficiencies of the grating. Thus, the PDL caused by the grating can be eliminated.

Figure 3C:
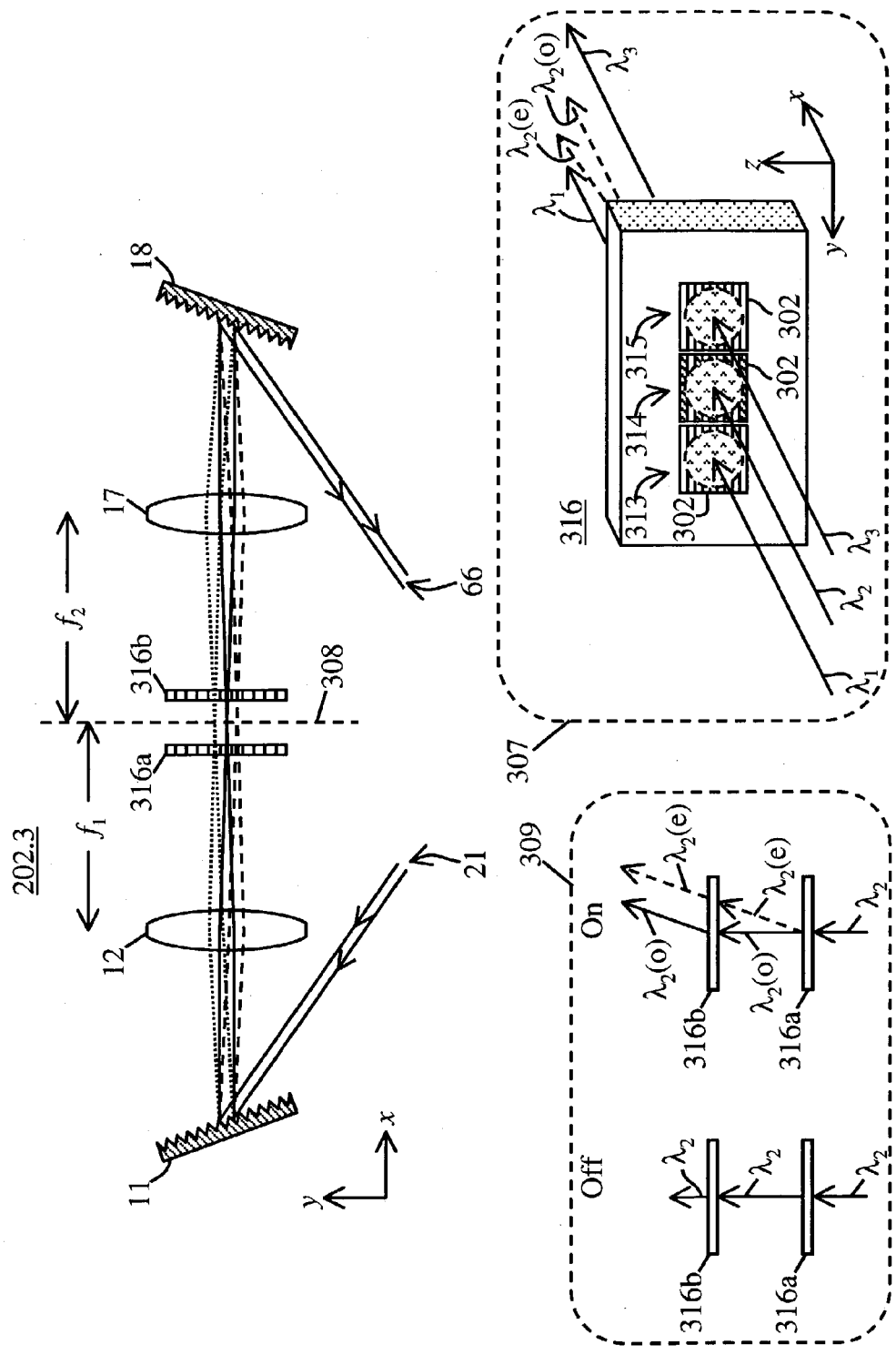
FIG. 3C is an illustration of a third wavelength-selective channel attenuator suitable for use within an R-OADM system in accordance with the present invention.
Figure 3D:
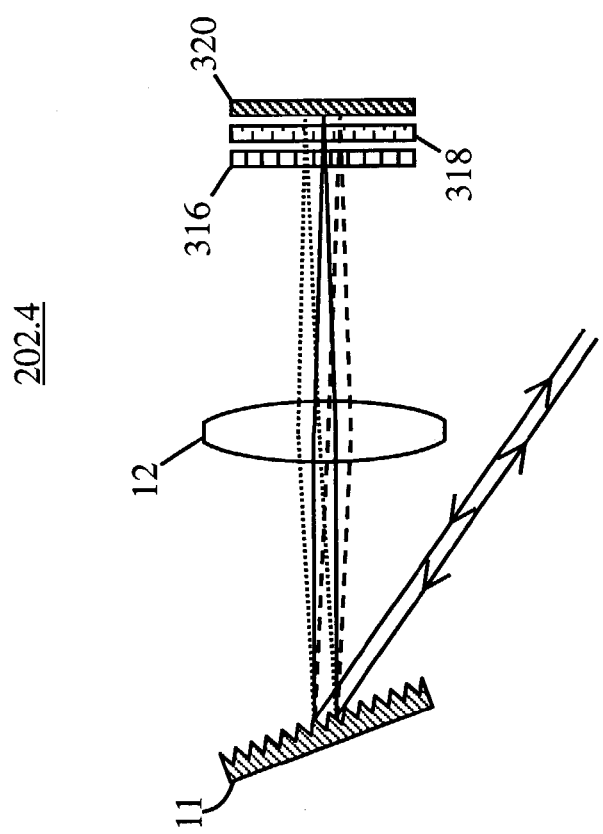
FIG. 3D is an illustration of a fourth wavelength-selective channel attenuator suitable for use within an R-OADM system in accordance with the present invention.

FIGS. 3C–3D provide illustrations, respectively, of a third and a fourth wavelength-selective channel attenuator that are suitable for use within an R-OADM system in accordance with the present invention. The wavelength-selective channel attenuator 202.3, shown in FIG. 3C, and the wavelength-selective channel attenuator 202.4, shown in FIG. 3D, are disclosed in greater detail in a co-pending United States Provisional Patent Application, 60/432,114, incorporated herein by reference in its entirety, filed Dec. 10, 2002 in the names of H. Yuan and S. Peng and titled "Method, Apparatus and System for a Variable Optical Attenuator Utilizing a Liquid Crystal Phase Grating". The wavelength-selective channel attenuator 202.3 comprises a first wavelength dispersive element 11, a first lens 12 optically coupled to the first wavelength dispersive element and a first segmented liquid crystal device 316$a$ optically coupled to the first lens 12. The wavelength-selective channel attenuator 202.3 further comprises a second segmented liquid crystal device 316$b$ optically coupled to the first segmented liquid crystal device 316$a$, a second lens 17 optically coupled to the second segmented liquid crystal device 316$b$ and a second wavelength dispersive element 18 optically coupled to the second lens 17 oppositely to the liquid crystal device 316$b$. Preferably, each of the first wavelength dispersive element 11 and the second wavelength dispersive element 18 comprises a diffraction grating or a prism. Further, as described in greater detail in the following discussion, each segment of the first segmented liquid crystal device 316$a$ and of the second segmented liquid crystal device 316$b$ comprises a different respective independently controllable phase grating structure 302. Such liquid crystal phase gratings are well-known in the art.

FIG. 3C represents pathways through the wavelength-selective channel attenuator 202.3 in a state in which it does not provide any attenuation. A collimated composite optical signal 21 is received into the apparatus 202.3. The collimated signal 21 may be provided by an optical fiber and collimator (not shown). The collimated composite optical signal 21 is then delivered to the first wavelength dispersive element 11, whereat its component channels are separated from one another according to their wavelengths by diffraction. The pathways of three such separated channels are shown by dotted, solid and dashed lines, respectively, in FIG. 3C. These separated channels are then focused by the first lens 12 such that each channel passes through a different respective segment of the first liquid crystal device 316a and, also, such that each channel passes through a different respective segment of the second liquid crystal device 316b.

Preferably, the first lens 12 and the second lens 17 are disposed at their respective focal distances, $f_1$ and $f_2$, from a hypothetical plane 502 midway between the two segmented liquid crystal devices 316a–316b. After passing through their focal points between the two liquid crystal devices, the lights of the separated channels once again diverge and are re-collimated by the second lens 17. The collimated lights of the channels are then re-combined into a composite optical signal by diffraction at the second wavelength dispersive element 18.

A detailed diagram of a segmented liquid crystal device 316, which may be either the first 316a or the second 316b segmented liquid crystal device is shown in the inset box 307 of FIG. 3C. Each of the different segments of the device 316a receives a different respective channel from the first wavelength dispersive element 11. Three segments are illustrated in inset box 307, the first segment 313 receiving the channel $\lambda_1$, the second segment 314 receiving the channel $\lambda_2$ and the third segment 315 receiving the channel $\lambda_3$. The path of the light of each of these channels is represented by rays entering and exiting the device 316a in inset box 307; the position of each channel upon the device 316a is represented by a respective spot. Generally, the number of segments comprising the device 316a will correspond to the number of channels input to the apparatus 202.3 from an input composite optical signal, which may be significantly greater than the three channels shown.

Each segment of the device 316 comprises a different respective independently controllable phase grating structure 302. Each phase grating structure 302 comprising one of the segments 313–315 of the device 316 may be configured so as to diffract light out of the plane of the separated channels. The operation of the phase grating structure 302 of each segment is independent of that of every other segment comprising the device 316. If a particular segment does not so diffract light, the channel directed to that segment does not incur attenuation at the segment. However, if the segment does diffract a portion or all of the light comprising the channel, then the channel incurs attenuation at the segment. In the example shown in the inset box 307 (FIG. 3C), the channels $\lambda_1$, $\lambda_2$ and $\lambda_3$ lie in the x-y plane, which is the dispersion plane of the first wavelength dispersive element 11. The phase grating structure 302 of each of the segments 313–315 is configured so, that when light is diffracted, this diffracted light passes out of this plane—that is, the light's propagation vector has a directional component in the direction of the z-axis after passing through the grating structure. In the example of inset box 307, this is accomplished by orienting the strips of each phase grating structure parallel to the x-y plane.

In the example shown in inset box 307, the 2 channel passes through the segment 314 comprising a phase grating structure configured so as to diffract light, whereas the $\lambda_1$ and 3 channels pass through segments 313 and 315 comprising phase gratings configured so as to not diffract light. Thus, the $\lambda_2$ channel will be attenuated by the liquid crystal device 316 whereas the $\lambda_1$ and $\lambda_3$ channels pass through their respective segments without attenuation.

The diffraction—and therefore the attenuation—of the $\lambda_2$ (or any other) channel by the liquid crystal device 316 only applies to a certain polarization component. If the first segmented liquid crystal device 316a diffracts (and, thereby, attenuates) a certain first polarization component, then the second liquid crystal device 316b is configured or oriented so that it may attenuate the remaining polarization component that is polarized orthogonally to the first polarization component. This two-stage attenuation process is shown schematically in inset box 309 of FIG. 3C, using the attenuation of channel $\lambda_2$ as an example. Although the inset box 309 uses the channel $\lambda_2$ as an example, the two-stage attenuation process may apply to any and all channels. Inset box 309 of FIG. 3C illustrates both an "Off" state, within which channel $\lambda_2$ is neither diffracted nor attenuated by either the first segmented liquid crystal device 316a or the second segmented liquid crystal device 316b and an "On" state, within which a polarization component $\lambda_2(e)$ is attenuated at device 316a and a second polarization component $\lambda_2(o)$ is attenuated at device 316b. This two-stage attenuation process ensures that the total attenuation is high and that no unwanted polarization components of channels "leak" through the attenuator 202.3 when it is desired to attenuate such channels.

The wavelength-selective channel attenuator 202.4, shown in FIG. 3D, is a wholly reflective apparatus. The wavelength-selective channel attenuator 202.4 comprises the same first wavelength dispersive element 11, first lens 12 and first segmented liquid crystal device 316a as already described in reference to the wavelength-selective channel attenuator 202.3 (FIG. 3C). However, the wavelength-selective channel attenuator 202.4 (FIG. 3D) comprises a quarter-wave ($\lambda/4$) plate 318 optically coupled to the first segmented liquid crystal device 316a at a side opposite to the lens 12 and further comprises a reflector 320 optically coupled to the quarter-wave plate 318 at a side opposite to the segmented liquid crystal device 316a.

The $\lambda/4$ plate 318 comprising the wavelength-selective channel attenuator 202.4 receives at least a portion of the light comprising each channel from each respective segment of the segmented liquid crystal device 316a. If the segment is configured so as to not diffract any light of the channel, then the segment passes substantially all of the channel light to the $\lambda/4$ plate 318. However, if the segment is configured to diffract light of the channel, thereby attenuating the channel, then the diffracted light comprises a certain polarization component and the light passing through to the $\lambda/4$ plate 318 predominantly comprises a polarization component polarized orthogonally to the diffracted polarization component. The plurality of channel lights that are transmitted through the $\lambda/4$ plate 318 travel to the reflector 320. The reflector reflects these channel lights back to and through the $\lambda/4$ plate 318 and the segmented liquid crystal device 316a. The $\lambda/4$ plate 318 and the reflector 320 operate so as to reflect a polarization component of each channel of the plurality of channels back through the same respective segment of the segmented liquid crystal device 316a through which it previously passed. The $\lambda/4$ plate 318 and the reflector 320 operate in such a way that, after two passes through the $\lambda/4$ plate 318, with the first pass being in a forward direction and the second pass being in a reverse direction, the linear polarization of said polarization component is rotated by 90 degrees during the second pass, relative to its orientation during the first pass. This polarization rotation ensures that, if a certain polarization component of a channel is attenuated during the first, forward pass through a segment of the segmented liquid crystal device 316a, then the remaining polarization component of the channel will also be attenuated during the reverse pass through the segment.

As described previously, in reference to the wavelength-selective channel attenuator 202.3 (FIG. 3C), each phase grating structure of the segmented liquid crystal device 316a is configured so as to operate independently of every other phase grating structure. Each phase grating structure can diffract light out of the plane of the separated channels. A first polarization component may be so diffracted during a first pass through the segmented liquid crystal device 316a and a second polarization component may be so diffracted after being reflected by the reflector 320 back through the λ/4 plate 318 to the liquid crystal device 316a. Any non-attenuated channels are returned back through the lens 12 to the wavelength dispersive element 11 where they are recombined into a WDM composite optical signal by diffraction.

Figure 4:
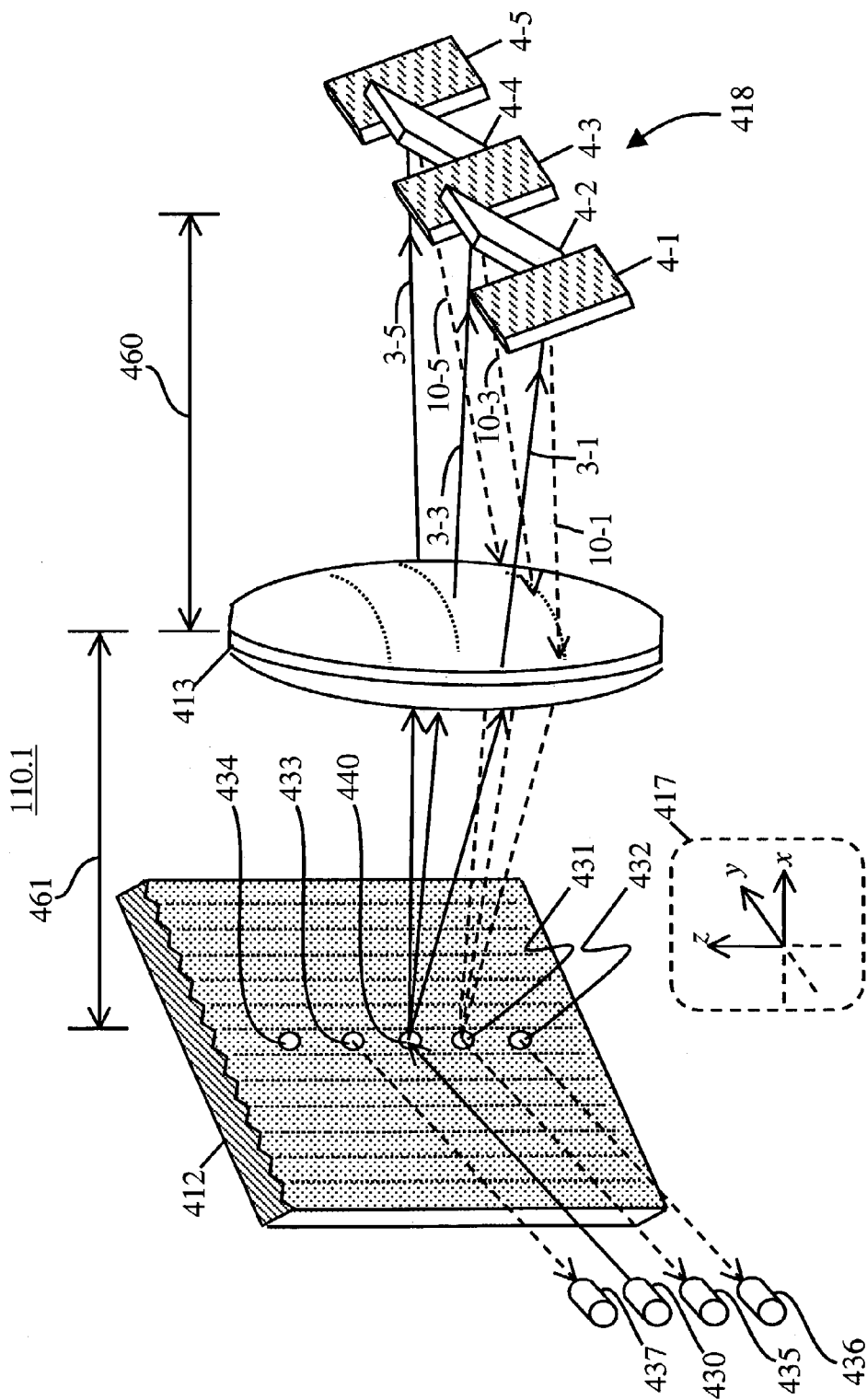
FIG. 4 is an illustration of a 1×n channel router that is suitable for use within an R-OADM system in accordance with the present invention.

FIG. 4 illustrates a first example of a 1×n channel router 110.1 that is suitable for use as channel router 110 within an R-OADM system in accordance with the present invention. The 1×n channel router 110.1 has been disclosed in a co-pending U.S. patent application titled "An Optical Wavelength Router using Reflective Surfaces to Direct Output Signals, Ser. No. 09/794,590, filed on Feb. 26, 2001. Applicant hereby incorporates this co-pending application herein by reference in its entirety. FIG. 4 illustrates the pathways of a first set of optical channels through the channel router 110.1 to only one particular output port 435.

The 1×n channel router 110.1 shown in FIG. 4 comprises a reflective apparatus 418, lens 413, and wavelength dispersive medium 412. Reflective apparatus 418 includes m number of pixels, each comprising an independently moveable reflective segment. In the present example, m=5 and the pixels are denoted 4-1 through 4-5 (for simplicity, the mechanical elements are not shown). Although the present example is limited to 5 pixels and, thus, five channels, the reflective apparatus may comprise any number n of pixels. Pixels 4-1 through 4-5 are aligned along the y-direction as defined by coordinate system 417. A single, broadband optical input signal (a light beam) travels from input port 430 substantially in the y-direction, as defined by coordinate system 417, towards spot 440 of wavelength dispersive medium 412. The input signal propagating from input port 430 includes a multiplexed multi-channel set of optical signals. Wavelength dispersive medium 412 is typically a diffraction grating or a prism. Wavelength dispersive medium 412 divides the input signal from input port 430 into wavelength-separated input components 3-1 through 3-5, shown by solid lines in FIG. 4. The wavelength-separated input components 3-1 through 3-5 travel substantially in the x-direction as defined by coordinates 417, towards lens 413. Lens 413 focuses each of the input components 3-1 through 3-5 onto pixels 4-1 through 4-5 of reflective apparatus 418. Lens 413 may be a set of two or more lens elements. Input components 3-1 through 3-5 each strike one of the pixels 4-1 through 4-5. Therefore, the number of pixels (m, equal to 5 in this example) and the number of input components (m) are the same.

As used herein, pixel 4-i refers to an arbitrary one of pixels 4-1 through 4-5 and input component 3-i refers to an arbitrary one of input components 3-1 through 3-5. Pixel 4-i directly or indirectly reflects input component 3-i back to wavelength dispersive medium 412 in a selected direction. The wavelength-separated light beam traveling from reflective apparatus 418 back to dispersive medium 412 is referred to as output component 10-i, which is one of output components 10-1 through 10-5. In the 1×n channel router 110.1 of FIG. 4, each of pixels 4-1 through 4-5 is configured to reflect an incident input component 3-i at one of n different angles. The output components 10-1 through 10-5 travel back to lens 413. The angle at which each component 10-1 through 10-5 travels is determined by the setting of the particular pixel that directs the particular output component.

Lens 413 focuses input components 3-1 through 3-5 onto pixels 4-1 through 4-5. Also, lens 413 directs output components 10-1 through 10-5 onto wavelength dispersive medium 12. By passing through lens 413, each output component 10-1 through 10-5 is collimated. In order to achieve the collimation, lens 413 may be spaced first focal length 460 away from the plane of reflective apparatus 418. First focal length 460 is the focal length of lens 413 in the medium (e.g., air) between lens 413 and reflective apparatus 418. Lens 413 may also be spaced by second focal length 461 from wavelength dispersive medium 412. Second focal length 461 is the focal length of lens 413 in the medium between lens 413 and wavelength dispersive medium 412.

Output components, from amongst output components 10-1 through 10-5, that strike the same spot on wavelength dispersive medium 412 are directed into the same output port. The number of output ports is determined by the number of settings of pixel 4-i, since the setting of pixel 4-i determines the direction of output component 10-i. The number of available settings affects the number of directions in which output component 10-i can travel, which, in turn, affects the number and the position of spots on wavelength dispersive medium 412 that output components 10-1 through 10-5 pass through. The number of spots on wavelength dispersive medium 412 through which output components 10-1 through 10-5 pass is equal to or greater than the number n of output ports.

FIG. 4 depicts, using dashed lines, one of the n possible directions in which output components 10-1 through 10-5 can travel to an output port. When reflective apparatus 4-i is set to reflect output components 10-i in the direction indicated in FIG. 4, the output component 10-i is directed by lens 413 onto spot 431 of wavelength dispersive medium 412. Output components reflected by other pixels in the direction indicated in FIG. 4 are also directed onto spot 431, and are then directed into the first output port 435. Similarly, pixels 4-1 through 4-5 can each be set to reflect an incident input component 3-1 through 3-5 in other directions (not shown) so as to reflect output components to any of spots 431–434. For instance, any output component 10-i reflected by pixel 4-i to spot 431 is directed into the first output port 435 whilst any output component reflected to spot 432 or 433 is directed to the second output port 436 or the third output port 437, respectively. In the example provided in FIG. 4, there is an additional spot 434 upon the wavelength dispersive medium 412 to which output components may be directed but which is not optically coupled to any output port. Therefore, any output components reflected to spot 434 will not be directed into any output port—that is, they will be lost from the system. The reflecting of output components to spot 434 provides a convenient means for preventing express channels from inadvertently being directed to any channel drop port. Note that, in the example shown in FIG. 4, the channel router 110.1 is a 1×3 router (that is, n=3) since it comprises a single input port 430 and three output ports 435–437.

Among the m number of micro-mirror pixels that are included in the 1×n channel router 110.1, some micro-mirror pixels may be configured so as to direct output components to spot 431 as shown in FIG. 4, whilst others may be configured with different orientations so as to direct output components to any of spots 432–434. Thus, in general, some output channels will be directed to output port 435 as shown in FIG. 4, while, at the same time, other output channels will be directed to any of the output ports 436–437 or will be directed away from all of the output ports (via spot 434). In FIG. 4, the mirror pixels 4-1, 4-3 and 4-5 (shaded) are shown disposed so as to deflect the three output components 10-1, 10-3 and 10-5, comprising the wavelengths $\lambda_1$, $\lambda_3$ and $\lambda_5$, respectively, to spot 431 and then to output port 435.

Figure 7:
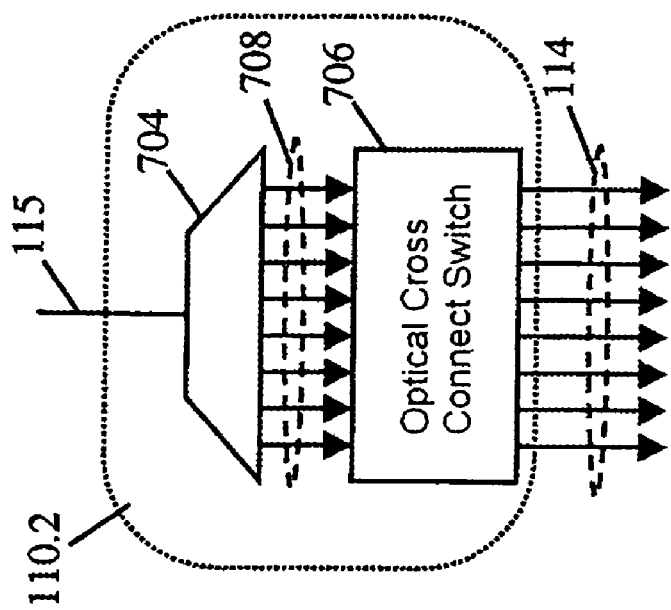
FIG. 7 is an illustration of a second 1×n channel router that is suitable for use within an R-OADM system in accordance with the present invention.

FIG. 7 illustrates a second example of a 1×n channel router 110.2 that is suitable for use as channel router 110 within an R-OADM system in accordance with the present invention. The 1×n channel router 110.2 represents an alternative to using the 1×n channel router 110.1 (FIG. 4). The 1×n channel router 110.2 comprises a de-multiplexer 704 whose m output ports 708 are optically coupled to the m inputs of an m×n optical cross connect switch 706. The plurality 114 of channel drop ports are optically coupled to the n outputs of the optical cross connect switch 706. Both the de-multiplexer 704 and the optical cross connect switch 706 are known optical components. The de-multiplexer 704 receives a plurality of m wavelength channels from an input which may comprise, for instance, the first optical coupling 115 and separates each wavelength to a respective one of the output ports 708. The optical cross connect switch 706 receives each wavelength channel at a respective one of its inputs and routes each such channel to a desired one of the channel drop ports 114.

Figure 5:
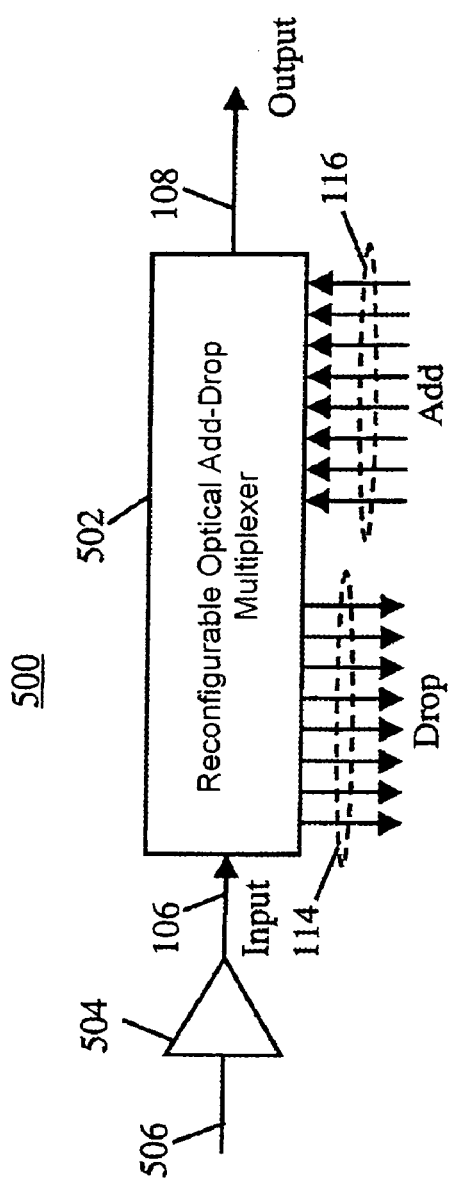
FIG. 5 is a diagram of a preferred system, in accordance with the present invention, for utilizing a re-configurable optical add-drop multiplexer within an optical communications system.
Figure 6:
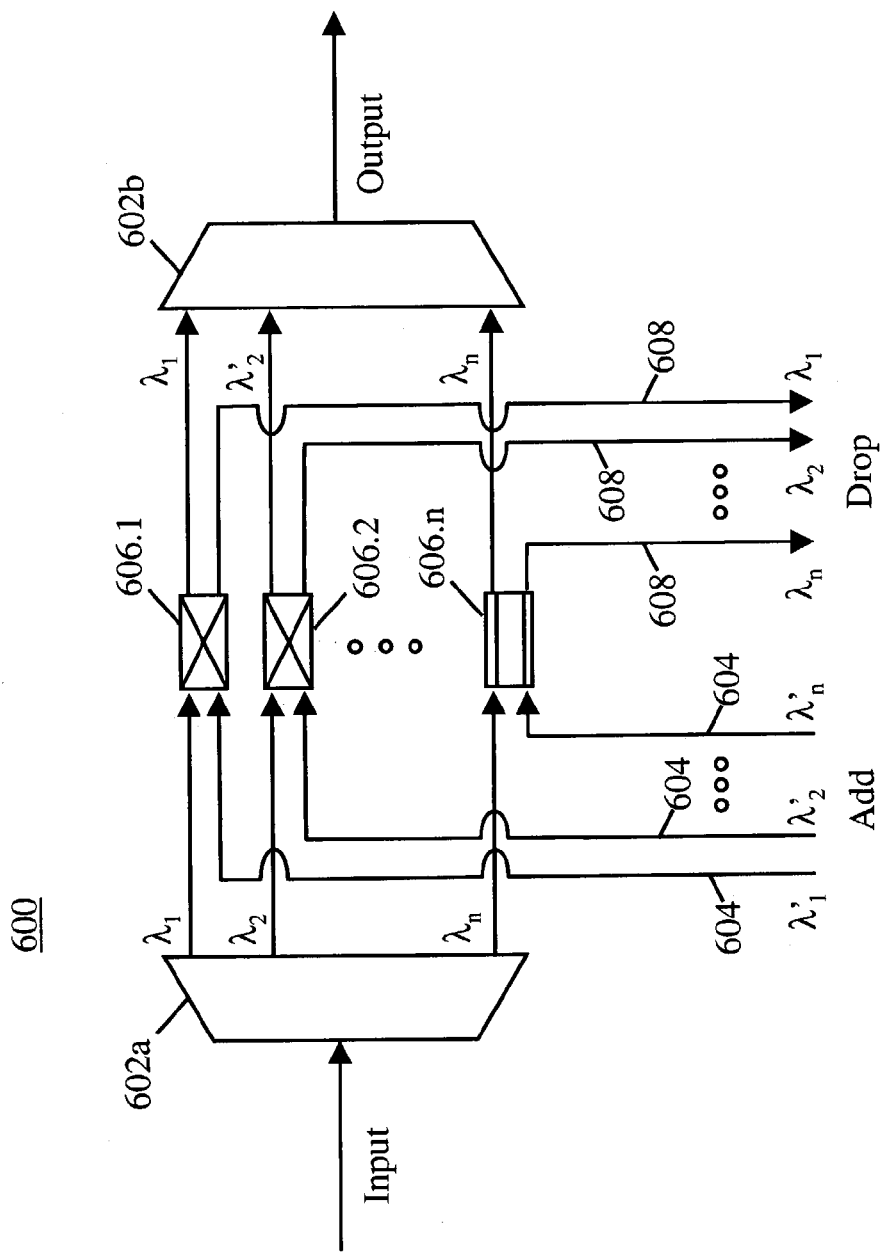
FIG. 6 is a diagram of a conventional re-configurable OADM.

FIG. 5 is a diagram of a preferred system, in accordance with the present invention, for utilizing a re-configurable optical add-drop multiplexer within an optical communications system. The system 500 shown in FIG. 5 comprises a network input 506, an optical amplifier 504 optically coupled to the network input 506, a re-configurable optical add-drop multiplexer (R-OADM) 502, an optical input 106 optically coupled between the optical amplifier and the R-OADM 502, an optical output 108 optically coupled to the R-OADM 502, a plurality 114 of channel drop ports and a plurality 116 of channel add ports, wherein the plurality of channel drop ports and the plurality of channel add ports are optically coupled to the R-OADM 502. The generalized R-OADM shown in FIG. 5 may comprise any one of the R-OADM 100 (FIG. 1A), the R-OADM 150 (FIG. 1B), the R-OADM 200 (FIG. 2A) or the R-OADM 250 (FIGS. 2B–2C). The input 106, output 108 and the plurality 114 of channel drop ports and the plurality 116 of channel add ports are identical to the same respective similarly numbered components shown in FIGS. 1A–2C.

In many usage situations that include a R-OADM within an optical communications network, the optical amplifier may be required prior to the input 106, as shown in FIG. 5, to boost the optical power of all input channels prior to their input to the R-OADM 502. Typically, the optical powers of the channels received from the network input 506 are weak upon arrival at the system 500 because of losses incurred during passage through portions of the optical network. Subsequently, each optical component within the R-OADM, such as the band separator 101, the optical splitter 111 the channel router 110, the 2×1 optical coupler 103, etc. causes further power loss in each channel because of insertion losses associated with each component. The wavelength-selective channel attenuator 202, in particular, comprises a primary function of reducing the optical power of all channels to a level at or below that of the weakest channel received into the R-OADM 502 from the input 106. Because of these many cumulative opportunities for channel power reduction, the resulting powers of channels delivered to the plurality 114 of drop ports or to the optical output may be too low to be, for instance, reliably detected or transmitted along a subsequent optical network span. The amplifier 504 boosts the optical power of channels so that, after exiting the R-OADM, channel power levels will be within operational constraints.

An apparatus, method and system for an improved re-configurable optical add-drop multiplexer (R-OADM) have been disclosed. Although the present invention has been disclosed in accordance with the embodiments shown, one of ordinary skill in the art will readily recognize that there could be variations to the embodiments and those variations would be within the scope of the present invention, which is defined by the claims appended hereto.

I claim:

1. A re-configurable optical add-drop apparatus, comprising:
    means for separating an optical input signal into a first signal having a plurality of q channels and a second signal having a plurality of q channels;
    a channel router having at least one input for receiving the first signal and having a plurality of n drop ports (n<q), the channel router routing n of the q channels of the first signal to the drop ports;
    a wavelength-selective channel attenuator with a controllable polarization modulator for attenuating selected channels of the second signal to output a third signal having a plurality of (q−n) channels; and
    an optical coupler for coupling the third signal with a fourth signal having a plurality of p channels to produce an optical output signal having (q−n+p) channels.

2. The apparatus of claim 1, wherein the means for separating comprises an optical splitter.

3. The apparatus of claim 1, further comprising a p×1 coupler having p add ports, for generating the fourth signal having a plurality of p channels from signals received through the p-add ports.

4. The apparatus of claim 1, further comprising an optical amplifier optically coupled to an input of the means for separating, for amplifying the optical input signal.

5. A re-configurable optical add-drop apparatus, comprising:
    a wavelength-selective channel attenuator with a controllable polarization modulator having an input for receiving a plurality of wavelength channels, the plurality of wavelength channels comprising a set of channels to be dropped and a set of channels to be passed; and
    an optical coupler optically coupled to an output of the wavelength-selective channel attenuator, for coupling the set of channels to be passed with a set of channels to be added to produce an output signal,
    wherein the wavelength-selective channel attenuator is capable of independently attenuating the power of each of the plurality of wavelength channels, the wavelength-selective channel attenuator completely attenuating the set of channels to be dropped and partially attenuating some or all of the channels in the set of channels to be passed.

6. The apparatus of claim 5, further comprising a first channel router and an optical splitter optically coupled between the wavelength-selective channel attenuator and the first channel router, the optical splitter having an input, a first output, and a second output, the first output of the optical splitter optically coupled to the first-channel router, the second output of the optical splitter optically coupled to the wavelength-selective channel attenuator.

7. The apparatus of claim 6, wherein the optical splitter comprises a 3-dB optical splitter.

8. The apparatus of claim 6, wherein the first channel router comprises a 1×n channel router having a single input and n drop ports.

9. The apparatus of claim 8, further comprising a second channel router having n drop ports, optically coupled to the optical splitter.

10. The apparatus of claim 5, further comprising a p×1 coupler optically coupled to the optical coupler, the p×1 coupler having p add ports and producing an output signal with the set of channels to be added, from signals received through the p add ports.

11. A method for re-configuring an optical add-drop apparatus having n drop ports, comprising:

receiving an optical input signal;
separating the optical input signal into a first signal having a plurality of q channels and a second signal having a plurality of q channels;
routing selected channels from the first signal to the n channel drop ports; and
attenuating selected channels from the second signal with a wavelength-selective channel attenuator having a controllable polarization modulator.

12. The method of claim 11, further comprising adding channels to the output of the wavelength-selective channel attenuator.

13. The method of claim 11, wherein the attenuating step comprises attenuating independently the power of each of the selected channels.

* * * * *